(12) United States Patent
Li et al.

(10) Patent No.: US 9,178,848 B1
(45) Date of Patent: Nov. 3, 2015

(54) IDENTIFYING AFFILIATED DOMAINS (75) Inventors: Wenxin Li, Cupertino, CA (US);
Michelangelo Diligenti, Zurich (CH);
Trystan Upstill, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 730 days.

(21) Appl. No.: 11/781,847

(22) Filed: Jul. 23, 2007

(51) Int. Cl.
*G06F 15/173* (2006.01)
*G06F 7/04* (2006.01)
*G06F 3/00* (2006.01)
*H04L 29/12* (2006.01)
*H04L 29/08* (2006.01)

(52) U.S. Cl.
CPC ............ *H04L 61/1511* (2013.01); *H04L 67/02* (2013.01)

(58) Field of Classification Search
CPC .................. G06F 2221/2119; G06F 17/30864; G06F 17/30887; G06F 3/0482; G06Q 30/02; G06Q 50/01; H04L 61/1511; H04W 4/001; H04N 21/44222
USPC ................ 709/245, 223; 715/733; 379/32.03; 705/80, 50
See application file for complete search history.

(56) References Cited

U.S. PATENT DOCUMENTS

| | | | |
|---|---|---|---|
| 5,265,065 A | 11/1993 | Turtle | |
| 5,410,688 A * | 4/1995 | Williams et al. | 1/1 |
| 6,285,999 B1 | 9/2001 | Page | |
| 6,321,227 B1 | 11/2001 | Ryu | |
| 6,449,765 B1 | 9/2002 | Ballard | |
| 6,526,440 B1 | 2/2003 | Bharat | |
| 6,601,100 B2 | 7/2003 | Lee et al. | |
| 6,745,248 B1 * | 6/2004 | Gardos et al. | 709/245 |
| 6,954,755 B2 * | 10/2005 | Reisman | 1/1 |
| 7,039,697 B2 * | 5/2006 | Bayles | 709/223 |
| 7,062,488 B1 * | 6/2006 | Reisman | 1/1 |
| 7,257,570 B2 | 8/2007 | Riise et al. | |
| 7,269,643 B2 | 9/2007 | Spaid | |
| 7,359,987 B2 * | 4/2008 | Stahura | 709/245 |
| 7,389,289 B2 | 6/2008 | Solaro et al. | |
| 7,403,939 B1 | 7/2008 | Virdy | |
| 7,472,160 B2 * | 12/2008 | King et al. | 709/203 |
| 7,543,055 B2 * | 6/2009 | Kohn | 709/224 |
| 7,680,796 B2 | 3/2010 | Yeh et al. | |
| 7,698,442 B1 * | 4/2010 | Krishnamurthy et al. | 709/229 |

(Continued)

OTHER PUBLICATIONS

Liu et al., "Indexing implicit locations for geographical information retrieval," 2006, ACM, pp. 1-3.

(Continued)

*Primary Examiner* — Esther B Henderson
*Assistant Examiner* — Margishi Desai
(74) *Attorney, Agent, or Firm* — Johnson, Marcou & Isaacs, LLC (57) ABSTRACT

Systems, methods, and computer program products are provided for identifying affiliated domains. A method includes identifying a plurality of domains, where each domain is associated with a particular hostname and each domain includes one or more resources, identifying a set of one or more linked domains, designating one or more domains within the set of linked domains as being affiliated with the first domain, and storing the domain affiliation information. Linked domains are domains from the plurality of domains that are linked to the first domain, and a second domain is linked to the first domain if one of the first or the second domains includes resources containing navigation links to resources of the other domain.

30 Claims, 5 Drawing Sheets (56) References Cited

U.S. PATENT DOCUMENTS

| | | |
|---|---|---|
| 7,747,598 B2 | 6/2010 | Buron et al. |
| 7,844,590 B1 | 11/2010 | Zwicky et al. |
| 8,046,350 B1 | 10/2011 | Singhal et al. |
| 8,078,707 B1* | 12/2011 | Watsen et al. ............... 709/223 |
| 8,200,694 B1 | 6/2012 | Diligenti et al. |
| 2002/0077929 A1* | 6/2002 | Knorr et al. .................. 705/26 |
| 2002/0085025 A1* | 7/2002 | Busis et al. .................. 345/738 |
| 2002/0129026 A1* | 9/2002 | Reardon ........................ 707/10 |
| 2002/0156905 A1* | 10/2002 | Weissman .................... 709/229 |
| 2002/0161901 A1* | 10/2002 | Weissman .................... 709/229 |
| 2002/0173946 A1* | 11/2002 | Christy ............................ 704/2 |
| 2003/0009592 A1* | 1/2003 | Stahura ........................ 709/245 |
| 2003/0097357 A1* | 5/2003 | Ferrari et al. ..................... 707/3 |
| 2003/0217076 A1* | 11/2003 | Heptinstall et al. ........ 707/104.1 |
| 2003/0233328 A1* | 12/2003 | Scott et al. ..................... 705/50 |
| 2004/0019588 A1 | 1/2004 | Doganata et al. |
| 2004/0111508 A1 | 6/2004 | Dias et al. |
| 2005/0044065 A1 | 2/2005 | McArdle |
| 2005/0044139 A1 | 2/2005 | Christian et al. |
| 2005/0055708 A1* | 3/2005 | Gould et al. .................... 725/25 |
| 2005/0065916 A1 | 3/2005 | Ge et al. |
| 2005/0071465 A1 | 3/2005 | Zeng et al. |
| 2005/0125391 A1 | 6/2005 | Curtis et al. |
| 2005/0154716 A1 | 7/2005 | Watson et al. |
| 2005/0187895 A1* | 8/2005 | Paya et al. ......................... 707/1 |
| 2005/0203875 A1* | 9/2005 | Mohammed et al. ............ 707/2 |
| 2006/0036719 A1* | 2/2006 | Bodin et al. .................. 709/223 |
| 2006/0036748 A1* | 2/2006 | Nusbaum et al. ............ 709/228 |
| 2006/0041562 A1* | 2/2006 | Paczkowski et al. ........... 707/10 |
| 2006/0064409 A1* | 3/2006 | Hardwick ........................ 707/3 |
| 2006/0161534 A1 | 7/2006 | Carson et al. |
| 2006/0195442 A1* | 8/2006 | Cone et al. ....................... 707/5 |
| 2006/0262786 A1* | 11/2006 | Shimizu et al. ............... 370/389 |
| 2006/0271531 A1 | 11/2006 | O'Clair et al. |
| 2006/0287936 A1* | 12/2006 | Jacobson ........................ 705/35 |
| 2006/0287985 A1 | 12/2006 | Castro et al. |
| 2007/0011168 A1* | 1/2007 | Keohane et al. ................ 707/10 |
| 2007/0043816 A1* | 2/2007 | Ishibashi ....................... 709/206 |
| 2007/0050586 A1* | 3/2007 | Shin et al. ..................... 711/163 |
| 2007/0050708 A1* | 3/2007 | Gupta et al. ................... 715/513 |
| 2007/0083505 A1* | 4/2007 | Ferrari et al. ..................... 707/5 |
| 2007/0234116 A1* | 10/2007 | Yoshikawa et al. ............ 714/13 |
| 2007/0234216 A1* | 10/2007 | Fitzpatrick et al. ........... 715/733 |
| 2007/0234351 A1* | 10/2007 | Iyoda et al. .................... 717/174 |
| 2007/0239713 A1* | 10/2007 | Leblang et al. ................... 707/6 |
| 2007/0283273 A1* | 12/2007 | Woods .......................... 715/738 |
| 2007/0283422 A1* | 12/2007 | Iyoda et al. ....................... 726/4 |
| 2007/0294391 A1* | 12/2007 | Kohn ............................. 709/224 |
| 2008/0005104 A1 | 1/2008 | Flake et al. |
| 2008/0005127 A1* | 1/2008 | Schneider ........................ 707/10 |
| 2008/0010273 A1 | 1/2008 | Frank |
| 2008/0016233 A1* | 1/2008 | Schneider ..................... 709/230 |
| 2008/0021874 A1* | 1/2008 | Dahl et al. ......................... 707/3 |
| 2008/0052358 A1* | 2/2008 | Beaven et al. ................. 709/205 |
| 2008/0059607 A1* | 3/2008 | Schneider ..................... 709/218 |
| 2008/0109553 A1* | 5/2008 | Fowler .......................... 709/229 |
| 2008/0133612 A1* | 6/2008 | Liu et al. ....................... 707/201 |
| 2008/0172344 A1* | 7/2008 | Eager et al. ..................... 705/80 |
| 2008/0172374 A1 | 7/2008 | Wolosin et al. |
| 2008/0189290 A1* | 8/2008 | Kim et al. ....................... 707/10 |
| 2008/0195603 A1* | 8/2008 | Gross et al. ....................... 707/5 |
| 2008/0209552 A1* | 8/2008 | Williams et al. ................ 726/22 |
| 2008/0222307 A1* | 9/2008 | Bhakta et al. ................. 709/245 |
| 2008/0235383 A1* | 9/2008 | Schneider ..................... 709/229 |
| 2008/0243821 A1 | 10/2008 | Delli Santi et al. |
| 2008/0250136 A1* | 10/2008 | Izrailevsky et al. ........... 709/224 |
| 2008/0294602 A1 | 11/2008 | Permandla et al. |
| 2008/0317217 A1* | 12/2008 | Bernardini et al. ........ 379/32.03 |
| 2009/0012866 A1 | 1/2009 | Celik et al. |
| 2009/0077221 A1 | 3/2009 | Eisenstadt et al. |
| 2009/0196122 A1* | 8/2009 | Crowell ......................... 367/127 |
| 2010/0287049 A1 | 11/2010 | Rousso et al. |

OTHER PUBLICATIONS

Hursh, "Local Search: The Relevance Dilemma," Jan. 18, 2007, ClickZ, pp. 1-3.

* cited by examiner

IDENTIFYING AFFILIATED DOMAINS

BACKGROUND

This specification relates to identifying affiliated domains.

A Uniform Resource Locator (URL) is a string of characters that identifies a resource (e.g., an addressable web document or file) on a computer network. A URL provides a means for locating a resource by describing the resource's location on the network. Each URL includes a hostname. A hostname is a unique name by which a network naming system identifies a particular device or group of devices that are attached to the network. Hostnames are used by naming systems for various networks (e.g., the Internet or local area networks) to identify devices that are attached to the network.

The network naming system used by the Internet, the Domain Name System (DNS), associates each hostname with a particular Internet Protocol (IP) address. An IP address can be associated with one or more distinct hostnames. For example, the DNS can map the different hostnames www.domain1.com and www.domain2.com to the same IP address. In this case, if a user inputs either hostname, by, e.g., entering the names into a web browser, the user will be routed to the same network location—the location identified by the single IP address.

In this specification, the term "domain" will be used to refer to those Internet resources that are addressable through URLs sharing the same hostname. A domain may include a very large number of resources and IP addresses, or it may include only a few resources and a single IP address. Under this definition, a domain will always be identified using its hostname: the hostname www.random.com, for example, will be used to indicate the collection of resources addressable through that hostname.

Each hostname ends in a top-level domain name. The top-level domain name can be, for example, a generic top-level domain name, e.g., .com or .gov. Alternatively, the top-level domain name can be a country code top-level domain ("ccTLD") name, e.g., .fr or .ca, which identifies the country in which the name was registered. Hostnames also include a second-level domain name immediately to the left of the top-level domain name. The second-level domain name can indicate a particular organization that is associated with the content on the domain. For example, the hostname www.random.com may indicate that the content is associated with an organization named Random, Inc. Hostnames having the same second-level domain name but different top-level domain names may be unrelated: for example, www.random.be and www.random.com may well be associated with distinct organizations.

A number of hostnames can belong to the same organization. For example, an organization can register hostnames in different countries (i.e., with a ccTLD name) in addition to registering a non-geographic hostname. The organization Random, Inc. might decide to register domain names www.random.ca and www.random.co.uk (registrations in Canada and the United Kingdom, respectively) in addition to a hostname www.random.com. The organization's websites may include substantially similar content, despite being found under different hostnames.

Search results presented to a user (e.g., in response to a search query) can include results corresponding to different resources, found on different domains, that can be considered substitutes for each other. A typical user may consider the resources on different domains belonging to the same parent organization—for example, on www.random.co.uk and on www.random.ca—to be similar enough that search results from both are redundant. The presence of such repetitive results can obscure other, unique resources identified within the search results, detracting from the effectiveness of the search algorithm.

SUMMARY

Particular embodiments of the subject matter described in this specification can be implemented to realize one or more of the following advantages. Particular results can be deemphasized within a list of search results for a search query if the domains corresponding to the results are affiliated with other domains appearing in the list. Consequently, the number of distinct search results initially presented to a user can be increased. Additionally, within the list of search results, the ranks (i.e., the ordinal positions of the results in the series of results) of affiliated domains can be swapped. This allows a user to view results that are more interesting (e.g., results that are local to the user, or results that correspond to a desired parent organization) at a higher position on the result list.

The details of the various aspects of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
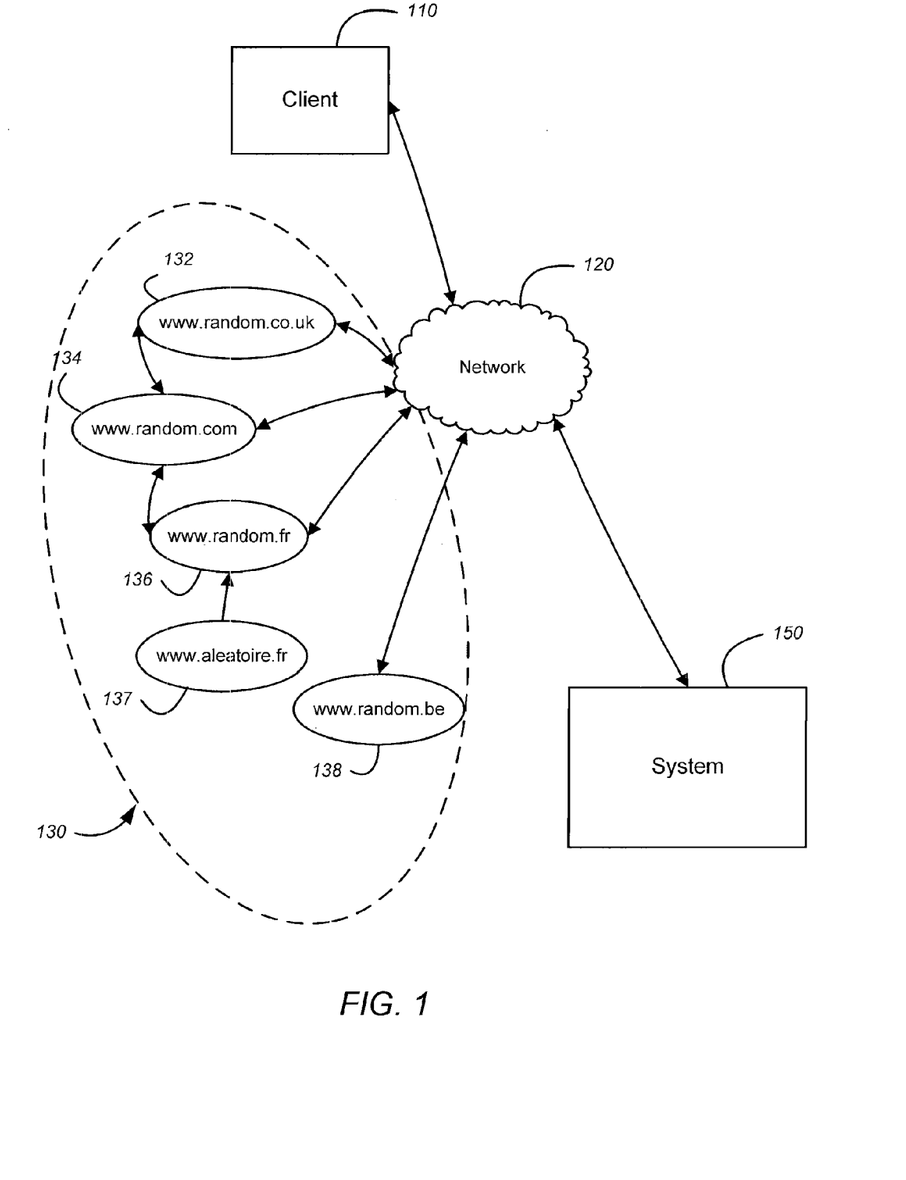
FIG. 1 is a block diagram illustrating an example system connected to a network.

FIG. 1 is a block diagram illustrating an example system 150 connected to a network 120. The system 150 can be, e.g., a web server that includes a search engine system. The network 120 can include one or more networks. The system 150 communicates with a client 110 over the network 120. Although only one client 110 and one system 150 are illustrated in FIG. 1, any suitable number of clients 110 and systems 150 may be connected through the network 120.

The system 150 communicates with a number of domains 130 over network 120. Each of the domains 130 is associated with a hostname that maps to one or more corresponding IP addresses. For clarity, this specification will identify each of the domains 130 using its distinct hostname. Each of the domains 130 generally includes a number of resources (e.g., web pages, static or dynamic documents, or other content). The resources of the domains 130 are addressable by the system 150 and the client 110 over the network 120.

A domain will be described as being "directly linked" to another domain if the domain includes Internet-addressable resources containing navigation elements, e.g., hyperlinks, that connect the two domains. In FIG. 1, www.random.com (134) is directly linked to both www.random.co.uk (132) and www.random.fr (136). Domains will be described, more generally, as being "linked" if the domains are connected by a chain of direct links. For example, domain www.aleatoire.fr (137) is linked to www.random.com (134) within two steps: www.aleatoire.fr links to www.random.fr, which links to www.random.com. Similarly, www.aleatoire.fr (137) is linked to www.random.co.uk (132) within three steps: www.aleatoire.fr links to www.random.fr; www.random.fr links to www.random.com; and www.random.com links to www.random.co.uk.

The system 150 can designate two or more of the domains 130 as being affiliated domains. Affiliated domains are domains which are linked to each other. For example, domain 134 in FIG. 1 (identified by www.random.com) is affiliated with www.random.co.uk (132) and www.random.fr (136), because www.random.com is linked to both domains.

Domains can be linked either mutually or unilaterally. Domains are mutually linked if each domain includes resources containing navigational elements that connect to resources on the other domain. A domain is unilaterally linked to another domain if only one domain includes resources containing navigational elements that connect to resources of the other domain. For example, www.random.com (134) and www.random.co.uk (132) are mutually linked: www.random.com links to www.random.co.uk, and www.random.co.uk also links to www.random.com. In contrast, www.aleatoire.fr (137) is unilaterally linked to www.random.fr (136): www.aleatoire.fr links to www.random.fr, but no resource on www.random.fr contains a link to www.aleatoire.fr.

Domains 130 can include domains that are not linked to any other domains and, therefore, that are not designated as being affiliated with any other domains. In FIG. 1, www.random.be (138) is unaffiliated with any other illustrated domain: for example, www.random.be (138) is not affiliated with www.random.com (134) because www.random.be (138) is not linked to www.random.com (134).

In some implementations, the system 150 can designate a first resource as being affiliated with a second resource in a similar manner to designating a first domain as being affiliated with a second domain. Resources are designated as affiliated in the same manner, and according to the same criteria, as are domains—i.e., resources are affiliated if they are linked to each other. For example, in some implementations system 150 designates a website as being affiliated with another website, if either website contains a navigational element connecting to the other. In other implementations, system 150 designates a website as being affiliated with a document, if, e.g., the website contains a navigational element linking to the document. In still other implementations, system 150 designates a document as being affiliated with another document. Affiliated resources can be contained on the same domain or on different domains. In a similar manner, system 150 can designate a resource as being affiliated with a domain. For example, if domain www.random.com (134) contains a website www.random.com/france/, and domain www.random.fr (136) is linked to or by www.random.com/france/, system 150 can designate resource www.random.com/france/ as being affiliated with domain www.random.fr (136).

Domains can be associated with one or more particular geographical locations. A domain's hostname can have a ccTLD name indicating that the domain was registered in a particular geographical location: for example, www.random.fr (136) has the top-level domain name .fr, indicating that the hostname was registered in France and, consequentially, suggesting that the domain may be physically hosted in France. Domain resources can be targeted toward users from one or more particular locales, e.g., by presenting content in a particular language, advertising for local businesses, or providing updates on area events. If resources on www.random.fr (136) present content in French, the domain may be associated with France and with any other French-speaking locales, such as Guadeloupe and Québec.

Domains can be associated with a particular geographical location even if their hostnames have ccTLD names corresponding to a different country or do not have ccTLD names at all. For example, www.random.co.uk (132) may be associated with Ireland if it includes content relating to events occurring in Dublin, even though the hostname does not have the Irish top-level domain name (.ie).

Alternatively, domains can be global domains that are not associated with any particular location. Global domains can include resources associated with an international organization or generic content that is not targeted to a single geographic location. Hostnames corresponding to global domains can have a generic top-level domain name, i.e., a top-level domain name ending in an extension such as .com, .org, or .net. Additionally, global domain can be heuristically deduced using criteria relating to document quality or user-supplied signals (e.g., user click data).

Domains can also be "parent" domains that are linked to a large number of subordinate domains. For example, a parent domain may include generic resources for a particular entity, such as the entity's main web page, and subordinate domains linked to the parent may include resources directed toward particular countries or operations: if www.random.com included Random, Inc.'s global homepage, www.random.co.uk and www.random.fr would likely include resources relating to Random, Inc.'s British and French operations, respectively. The system 150 can identify parent domains as domains that are linked, either unilaterally or mutually, to more than a specified threshold number of domains. Alternatively, within a set of affiliated domains, a parent domain can be the domain that directly links to, or is linked to by, more domains than any other affiliated domain. A parent domain can be, and often will be, a global domain.

Resources contained on a domain can similarly be associated with one or more particular geographical locations. As described above, resources may present content in a particular language of a locale. Resources may include locale-specific content, e.g., advertisements for local businesses or information on local news or events. Portions of the resource's URL may indicate an association with a geographical location. For example, the web site www.random.com/france/ indicates that the resource may be associated with France.

The system 150 can use various criteria, in addition to linking criteria, to designate domains as affiliated. In some implementations, the system 150 designates domains as affiliated only if they are linked to other domains within a specified number of steps, e.g., within three steps. In other implementations, the system designates domains having the same second-level domain name as being affiliated. Under this designation, www.random.co.uk (132) and www.random.fr (136) would be designated as affiliated with www.random.com (134), because hostnames for all three domains share the second-level domain name of 'random.' In contrast, www.aleatoire.fr (137) has a different second-level domain name—'aléatoire' being French for the English word 'random'—and would therefore not be designated as affiliated with www.random.com (134).

The client 110 is used by one or more users. The users use one or more applications on the client 110 in order to communicate with the system 150 and the domains 130. For example, the user on the client 110 can use a web browser application to submit a search query to a search engine. The user receives results to the search query from the system 150. The user can select one or more of the received results and can address associated content (e.g., by clicking on a link contained in the result).

The system 150 uses the geographical locations associated with the domains 130 to determine whether a particular domain is local for a particular user (e.g., a user at client 110). The user's locale can be any location in which the user is likely to be physically located or in which the user is likely to be interested. The system 150 can infer a location for the user using information about the user's network connection (e.g., the user's IP address). Additionally or alternatively, the server can specifically ask the user to provide a location or the user account information can include a location. The system 150 can also infer the user's location from other information, e.g., the user's language preferences or the location of the search engine accessed by the user.

The system 150 includes a search engine that provides an ordered listing of results in response to search queries received from the client 110. Each result can include, for example, a title, anchor text, and a URL identifying a particular resource. Each result also corresponds to a particular domain identified by the hostname in the URL.

The system 150 identifies affiliated domains represented in the ordered listing of results. The system 150 can designate domains as being affiliated in real time, upon receiving the search results, or offline, by, for example, comparing the domains corresponding to the results with an index of domain affiliation information. The system 150 uses a user location to alter the position of one or more results within the ordered listing of results.

In some implementations, the system 150 uses a user location to demote one or more results within the ordered listing of results corresponding to domains affiliated with other domains appearing in the results. For example, results that are non-local to the user and correspond to an affiliated domain can be demoted. Additionally or alternatively, the system 150 can demote affiliated results (i.e., results corresponding to an affiliated domain) relative to results corresponding to global domains. For example, the system 150 can conserve the position of a result corresponding to a global domain (i.e., can maintain the original rank of the result within the ordered listing of results) and demote one or more results corresponding to location-specific domains affiliated with the global domain.

Conversely, in other implementations, the system 150 uses a user location to promote one or more results within the ordered listing of results. For example, the system 150 can promote unaffiliated results, such that the user is presented with a greater number of diverse results at higher positions within the ordered listing. Alternatively, the system 150 can promote affiliated results. In still other implementations, the system 150 uses a user location to cluster affiliated results within the ordered listing of results. For example, the system 150 can demote and/or promote affiliated results such that the affiliated results are presented to the user in groups, i.e., at adjacent and consecutive positions within the ordered listing of results. In this way, a user can easily identify which results are affiliated within the ordered listing of results.

The system 150 reorders the listing of results based on any demotions and presents the reordered results to the client 110.

Figure 2:
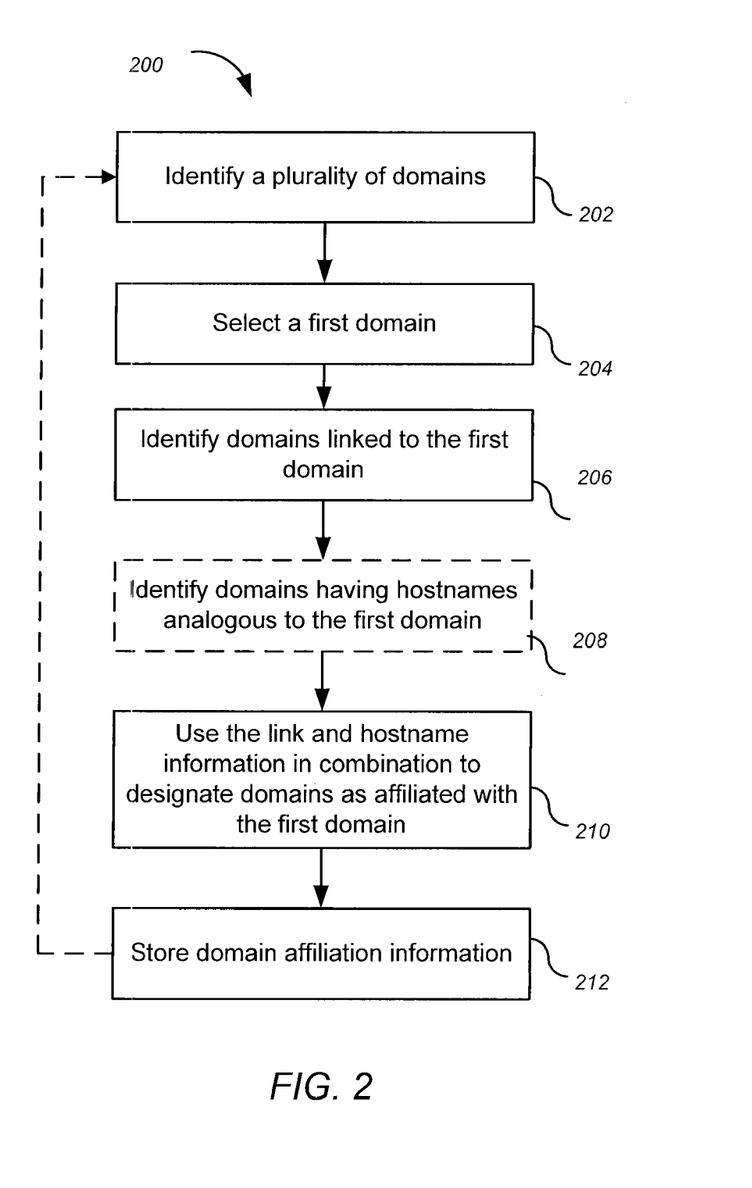
FIG. 2 shows an example method for identifying affiliated domains.

FIG. 2 shows an example method 200 for identifying affiliated domains. For convenience, the method 200 will be described with reference to a computer system (e.g., the system 150) performing the method. The system identifies a plurality of domains (202). Each domain of the plurality of domains can include one or more web pages or other resources.

The system selects a first domain of the plurality of domains (204). In some implementations, the system selects the first domain at random. Alternatively, the system can select the first domain according to one or more criteria. In some implementations, the system selects a parent or global domain (e.g., www.random.com) as the first domain. In other implementations, the system selects the first domain according to its top-level domain name. For example; the system can select a domain having a name ending in .ca, .net or .edu as the first domain. Alternatively, the system can select a domain corresponding to the first result in an ordered list of search results responsive to a user query.

In other implementations, the system selects the first domain according to information associated with resources included on the domain. For example, the system can select the first domain based on scores associated with resources on the domain. A score can be an information retrieval score calculated according to factors measuring the quality of a resource, e.g., anchor text of hyperlinks contained in the resource or the prominence of query terms in the resource. The score could also be a combination of an information retrieval score and a second score signifying the resource's relative importance, as indicated by the a network of hyperlinks to and from the resource. Alternatively, the system can select the first domain according to link information—for example, the domain directly linked or mutually linked to the greatest number of domains.

In still other implementations, the system selects the first domain using external data. For example, the system can process user click data to select a domain that satisfies a requisite threshold of user popularity.

The system identifies domains linked with the first domain (206). The system identifies a set of domains that are directly linked, either mutually or unilaterally, to the first domain. For example, if the system 150 selects www.random.fr (136) as the first domain, the system will identify www.random.com (134) and www.aleatoire.fr (137) as the set of domains directly linked to www.random.fr (136). The system can then identify all, or some portion, of the total domains linked to the first domain by identifying domains directly linked to that set of domains. Continuing with the above example, the system 150 identifies www.random.co.uk (132) as directly linked to www.random.com (134), and therefore identifies www.random.co.uk (132), www.random.com (134), and www.aleatoire.fr (137) as linked to www.random.fr (136).

The system can continue this process for a specified number of iterations to identify domains linked to the first domain within a specified number of steps. Alternatively, the system can continue this technique until all domains with available linkage information have been identified.

The system optionally identifies domains having hostnames analogous to that of the first domain (208). The system can designate domains having the same second-level domain name as having analogous hostnames. For example, referring to FIG. 1, domains www.random.com (134), www.random.co.uk (132), www.random.fr (136), and www.random.be (138) would be identified as having analogous hostnames under this rule. In some implementations, the system designates analogous hostnames using the DNS. The system can access hostname information stored by a DNS server to identify all domains having the same second-level domain name as the first domain.

The system uses the link and hostname information in combination to designate one or more domains as affiliated with the first domain (210). In some implementations, the system identifies a first set of domains having analogous hostnames to the first domain and independently identifies a second set of domains linked to the first domain. The system designates affiliated domains by combining the first and second sets of domains using various techniques. For example, the system can designate any domain appearing in both the first and second sets of domains (i.e., any domain that is linked to the first domain and that also has an analogous name to the first domain) as affiliated with the first domain. By requiring affiliated domains to appear in both the link and hostname sets, the system reduces the likelihood of false positive results. Alternatively, the system can designate those domains appearing in only the second set of domains (i.e., domains linked to the first domain) as affiliated with the first domain. This technique designates a greater number of domains as affiliated, although it can provide a greater number of false positive results.

In other implementations, the system combines the link and hostname information in a particular order to determine domains affiliated with the first domain. In some implementations, the system first identifies a set of domains linked to the first domain within a specified number of steps. The system then designates as affiliated those linked domains having analogous hostnames to the first domain. For example, the system can use DNS records to identify those domains linked to the first domain that also have the same second-level domain name.

The system stores the domain affiliation information (212). The system can store the affiliation information in an index and can perform the indexing offline, e.g., during an indexing phase of a web search algorithm that is prior to or not in response to a particular user query. The index is searchable such that, for a given domain, a system can use the index to identify domains that are affiliated with any given domain. The index can be implemented as any appropriate data structure.

The system optionally repeats the method 200 to identify domains affiliated with one or more additional domains. Information related to multiple sets of affiliated domains can be stored in a single index, or independent indexes can be created to store information related to multiple sets of affiliated domains. The system can repeat the method 200 periodically (e.g., daily or weekly) in order to update indexes to account for changing domain characteristics and revisions or additions to network link structure.

The method 200 can be illustrated by referring to FIG. 1. A number of domains 130 are identified (202). Global domain www.random.com (134) is selected as the first domain (204). Domains www.random.co.uk (132), www.random.fr (136) and www.aleatoire.fr (137) are selected as the set of domains directed linked to the first domain (206). Domains www.random.fr (136), www.random.be (138), and www.random.co.uk (132) are selected as a second set of domains having analogous hostnames to the first domain (208).

The system uses the domain link and hostname information in combination to designate domains as being affiliated (210). Different combination techniques can be used according to the particular goals or requirements of an application. In some implementations the system designates as affiliated only those domains belonging to both sets: www.random.fr (136) and www.random.co.uk (132), in the example of FIG. 1. This technique minimizes the likelihood of false positive results, i.e., incorrectly designating unaffiliated domains as affiliated.

In other implementations, the system first identifies a set of linked domains and designates a subset of domains as affiliated by editing this set using hostname information. In FIG. 1, domains linked to www.random.com (134) (i.e., www.random.fr (136), www.aleatoire.fr (137), and www.random.co.uk (132)) are initially identified as a set of linked domains. Next, the system identifies domains within this set having hostnames analogous to the first domain, and excludes domains having non-analogous names (i.e., www.aleatoire.fr) from the set. This technique reduces the likelihood of false positive results. Additionally, this technique reduces runtime because the system performs the step of identifying domains having analogous hostnames on a subset, rather than the entire plurality, of domains.

In still other implementations, the system first identifies a set of domains having analogous hostnames and edits this set using link information. The server 150 identifies domains with hostnames analogous to www.random.com (134) (i.e., www.random.fr (136), www.random.be (138), and www.random.co.uk (132)) and examines each domain's link information to exclude domains that are not linked to the first domain from the set. For example, the system verifies that www.random.fr (136) and www.random.co.uk (132) are linked to www.random.com (134) and excludes www.random.be (138)—which is not linked to www.random.com (134)—from the set of identified domains. The system designates domains in this set as affiliated domains. Optionally, the system adds domains that are linked to the domains in the set. For example, the system can examine the links associated with www.random.fr (136) and www.random.co.uk (132), identify www.aleatoire.fr (137) as being linked to www.random.fr (136), and add www.aleatoire.fr (137) to the set of affiliated domains. This technique allows the server to produce a complete set of affiliated domains while still providing runtime advantages.

The system stores the domain affiliation information (212). The system can store affiliation information in, for example, an index, and can optionally repeat method 200 for additional domains. For example, as www.random.be (138) was not identified as an affiliated domain during the first iteration of the preceding example, the server 150 can repeat the method 200 with www.random.be (138) as the first domain.

As seen in the preceding examples, techniques for identifying affiliated domains need not produce identical results. Affiliated domains can be designated according to the goals of a particular task. For example, the system can minimize false negative results by using a technique that is over-inclusive in identifying the affiliated domains. Alternatively, the system can minimize false positive results by using a technique with high precision. The system can select techniques to maximize efficiency or minimize system runtime.

In some implementations, the system uses factors instead of or in addition to, hostnames to identify affiliated domains. The system can use IP addresses to recognize domains that are hosted or owned by a common entity (e.g., through querying a database using a protocol such as WHOIS) and designate those domains as affiliated. The system can use information relating to domain name registration, such as a server address or registrar. The system can also use content-based or keyword information. For example, the system can designate domains containing resources (e.g., web pages) having similar content as affiliated domains.

Additionally, user or administrator feedback can be used to designate affiliated domains. Webmasters can specify domains or resources to which their web sites are affiliated. Creators of the resources of one domain can use tags indicating an affiliation with the resources of another domain. The system can extract affiliation information from shared directories or databases. For example, the system can designate domains including common user-created tags or interfaces (e.g., using the Dictionary Open Service Interface Definition) as affiliated. The system can use these factors individually or in combination to identify and index affiliated domains.

Figure 3:
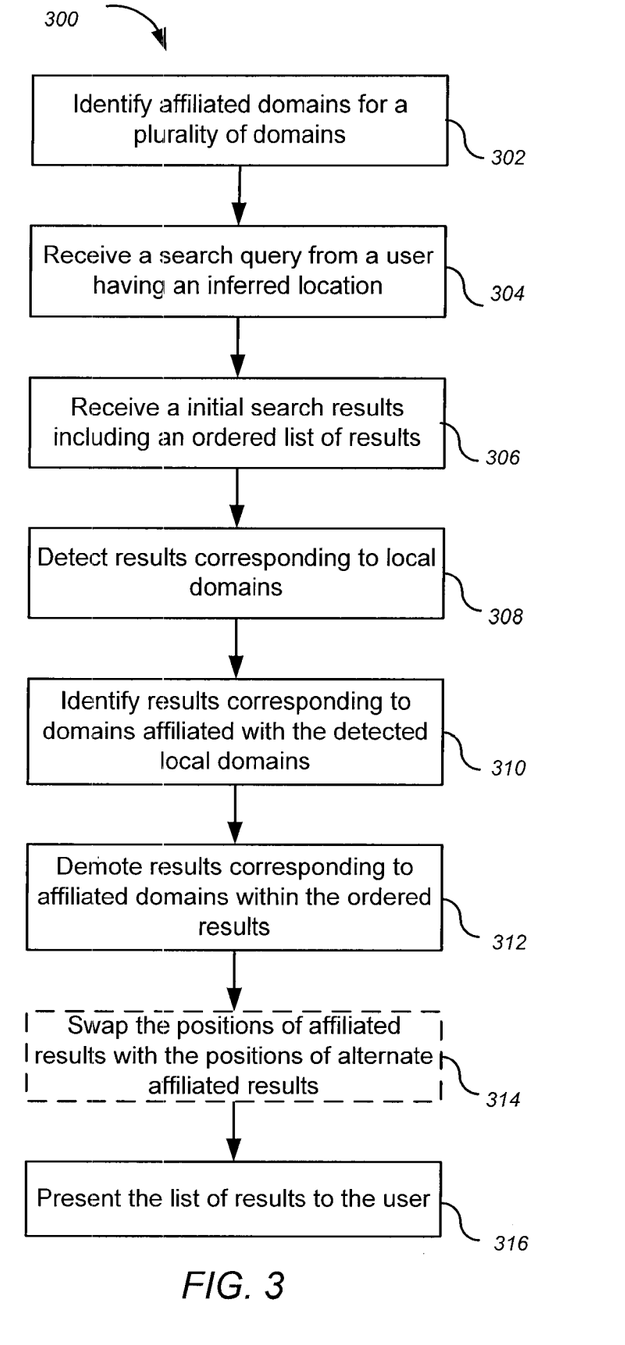
FIG. 3 shows an example method for presenting search results to a user in which affiliated domains are detected and demoted.

FIG. 3 shows an example method 300 for presenting search results to a user in which affiliated domains are detected and demoted. For convenience, the method 300 will be described with reference to a computer system that performs the method. The system identifies affiliated domains for a plurality of domains (302). The system can identify affiliated domains using, for example, the method 200 shown in FIG. 2.

The system receives a search query from a user having an inferred location (304). The system infers the user's location from information associated with or provided by the user. For example, the system can communicate with the user's network access provider (e.g., the user's Internet Service Provider) to obtain location information. The system can specifically prompt the user for location information. The system can infer a location from the user's language preferences (e.g., operating system language settings, the language of the search engine, or the language of the search query) or from the IP address of the user's network connection. The system can also infer the user location from the location of the user's search engine. For example, if the user provides a search query to an engine located in Italy—e.g., to www.google.it— the system infers that the user location is Italy.

The system receives initial search results including an ordered list of results (306). The system receives the search results, for example, from one or more dedicated search engines that generate search results in response to user search queries.

The system detects results corresponding to local domains within the ordered list of results (308). A domain is considered "local" if the geographical information associated with the domain corresponds to the particular location of the user. An example technique for identifying locales associated with a domain is described in co-pending and commonly owned U.S. patent application Ser. No. 11/781,843, titled "IDENTIFICATION AND PROMOTION OF LOCAL SEARCH RESULTS," filed Jul. 23, 2007, which is incorporated by reference. In some implementations, the system uses the content of resources included in the domain to identify local domains. For example, the system can identify domains including hostnames with the Italian ccTLD name (.it) or web pages presented in Italian as local domains for a www.google.it user.

The system identifies results within the ordered results corresponding to domains affiliated with the local domains (310). In some implementations, the system identifies results for affiliated domains by searching an index containing domain affiliation information, e.g., an index created by the method 200. In other implementations, the system designates domains as being affiliated in real-time, e.g., during the presentation stage of a web search algorithm or in response to a specific user request.

In some implementations, the system only identifies domains affiliated with a limited number of local domains. For example, the system can identify domains affiliated with the five most highly-ranked local domains. Alternatively, the system can identify domains affiliated with local domains appearing on the first two pages of results. In other implementations, the system identifies affiliated domains for all local domains that are represented in the results.

The system demotes results corresponding to domains affiliated with the local domains (312). In some implementations, the system demotes all such affiliated results. In other implementations, the system can use various criteria to demote particular affiliated results and conserve the rank, i.e., the position within the ordered listing of results, of other affiliated results. For example, the system can conserve the rank of affiliated results corresponding global domains (e.g., affiliated domains with names ending in .com) because users may be equally interested in global and local content. The system can conserve the rank of affiliated results corresponding to domains associated with locations having a relationship to the user location. For a user with an inferred location of Canada, the system can conserve the rank of the result corresponding to foreign domain www.random.co.uk, as Canadian users may be interested in content associated with the United Kingdom due to the political and historical connection between the countries. Additionally or alternatively, the system can demote affiliated results based on their position in the search results. For example, the system can demote affiliated results only if the results appear after the first page of search results, because this may lead to a greater variety of results being presented to a user on the first page.

In some implementations, the system demotes results corresponding to affiliated domains by shuffling the position of a result down the ordered list by a specified number of places. For example, the system can demote a result by five places within the list of search results. The system can demote affiliated results by a number of places sufficient to ensure that no affiliated results are ranked above results corresponding to a local domain. In some implementations, the system demotes affiliated results to a second or subsequent page of results.

The system can demote affiliated results by lesser or greater amounts according to various criteria. For example, the system can apply a lesser demotion to results corresponding to global domains, i.e., can demote global affiliates by fewer positions than it demotes other affiliated results by. The system can apply a lesser demotion to affiliated results which include content likely to be pertinent to the user. For example, if the system identifies www.random.au as a non-local domain with respect to a user in Canada, the system can nonetheless apply a lesser demotion because www.random.au presents content in the user's same language. Conversely, the system can apply a greater demotion to affiliated results unlikely to be useful to the user, e.g., to results corresponding to domains having geographical locations remote from the user's locale.

In a similar manner, the system can promote results within the ordered list of search results. For example, the system can promote results corresponding to domains unaffiliated with local domains, in order to provide the user with a greater variety of results near the top of the result list. Alternatively, the system can demote and/or promote affiliated results such that all affiliated results are clustered together within the ordered listing of results. In this way, the system can present the user with groups of affiliated results, potentially enhancing readability.

Optionally, the system swaps the position of one or more affiliated results with alternate affiliated results (314). This allows the rank to be elevated for affiliated results that may be of particular interest to a user. The system uses one or more presumption heuristics to determine whether to swap the ranks of affiliated domains. These heuristics can be based on, e.g., user feedback or click data. For example, the system can presume that users will be most interested in local results and can accordingly swap the ranks of results corresponding to local domains with earlier-appearing results corresponding to affiliated global or foreign domains. This allows the system to present local or more pertinent results to the user at a higher position within the ordered results.

The system can presume that users will be more interested in results associated with a parent organization (e.g., results corresponding to global domains) than in results related to the organization's branches in countries foreign to the user. For a user in the United Kingdom, for example, the system can therefore replace the rank of a result corresponding to www.random.ca with the rank of a result corresponding to www.random.com. Similarly, the system can presume that users will be more interested in content that is geographically proximate to the user location than in content relating to remote locations, and can accordingly replace the rank of an earlier-appearing result corresponding to www.random.ca, for example, with a result corresponding to www.random.fr, France being closer to the United Kingdom than Canada.

The system can swap results with affiliated results corresponding to local domains. For example, if www.random.ca appears higher in the ordered search results for a user in the United Kingdom than the local domain www.random.co.uk, the system can identify www.random.ca being affiliated with www.random.co.uk and swap the ranks of the result corresponding to www.random.co.uk and www.random.ca.

Affiliated results for domains associated with non-local geographical locations can be swapped with affiliated global results, the presumption being that a user will be more interested in global content than in content associated with a geographical location not local to the user. For example, for a United Kingdom user the system can swap the rank for a result corresponding to www.random.org with the rank of earlier-appearing www.random.ca. The system can also swap certain affiliated non-local results with other affiliated non-local results that may be of more interest to a user. For example, a user from the United States will likely find content associated with Canada more relevant that content associated with France, and the system can therefore swap the rank of www.random.ca with the rank of earlier-appearing affiliated result www.random.fr.

The system presents the list of ordered results to the user (316). The final ordering of the results can include the various demotions and rankings produced by the method 300.

Figure 4A:
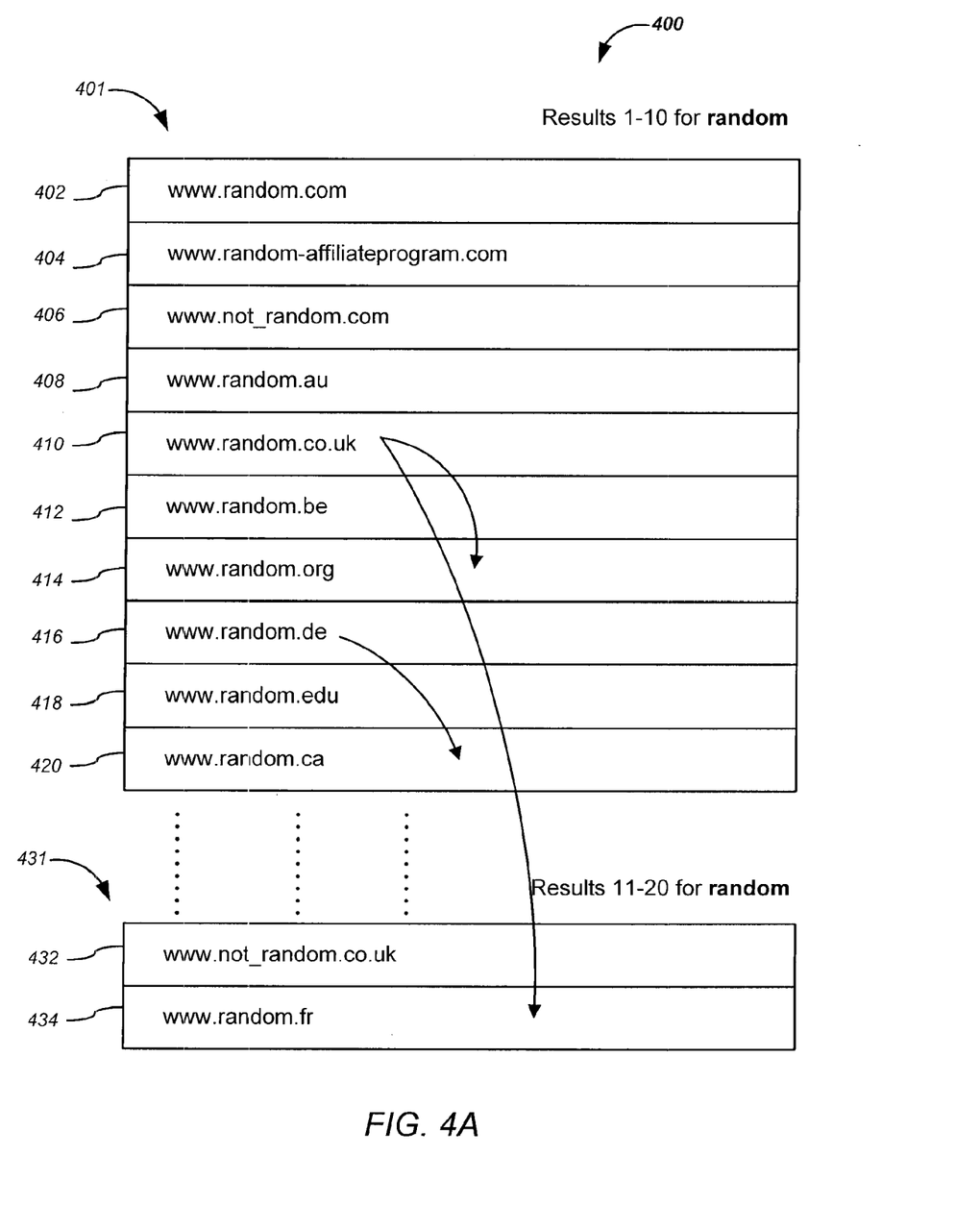
FIGS. 4A and 4B show a list illustrating demotion and swapping of affiliated results within an ordered listing of search results.
Figure 4B:
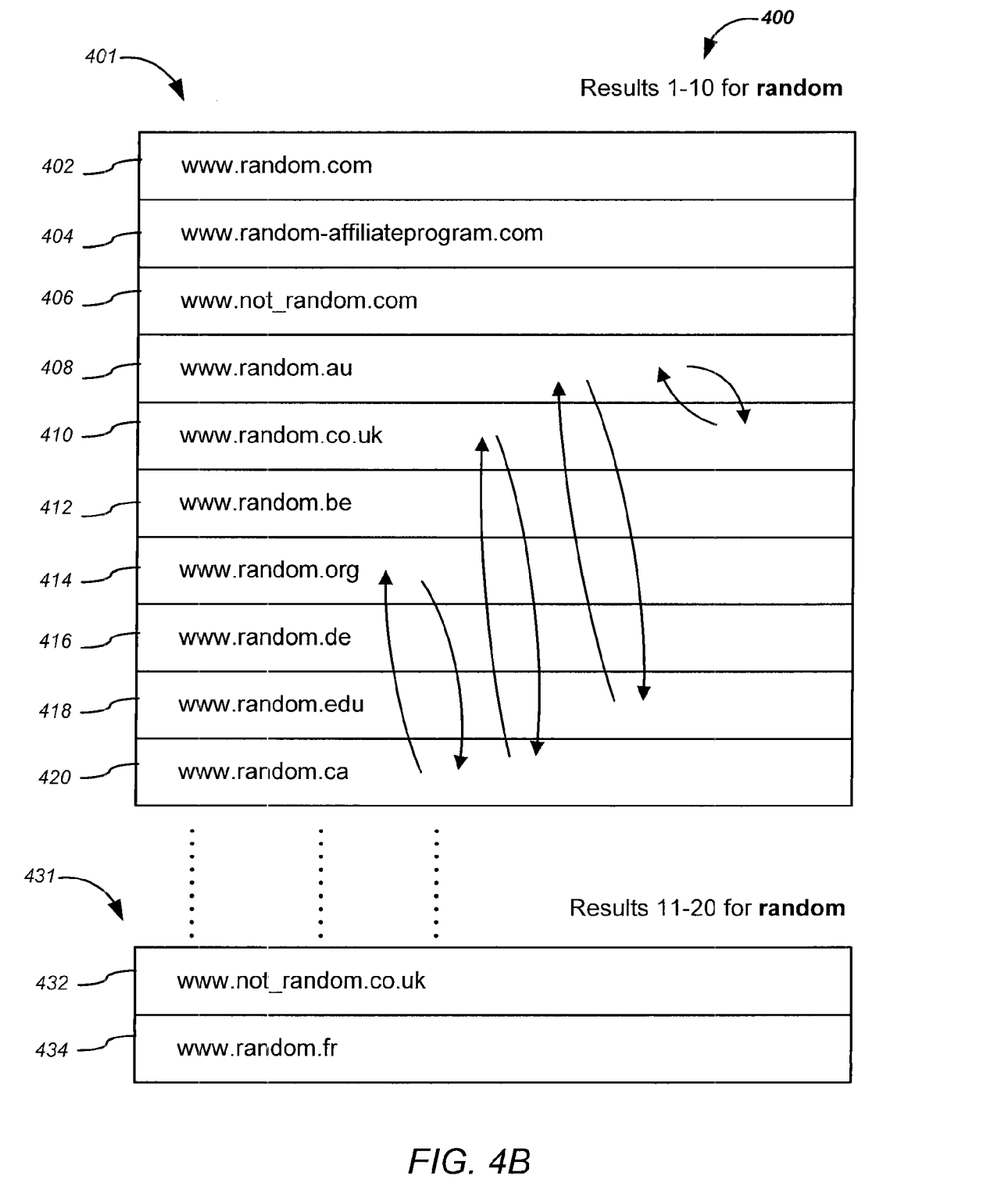

FIGS. 4A and 4B show a list illustrating demotion and swapping of affiliated results within an ordered listing of search results. In FIGS. 4A-4B, a result list 400 includes an ordered list 401 of results responsive to a user query for 'random.' Each result corresponds to a particular domain (e.g., result 420 corresponds to domain www.random.ca). The user has an identified location. For purposes of illustration, the user's location is taken to be Canada. List 401 is a first page of results corresponding to domains 402, 404, 406, 408, 410, 412, 414, 416, 418, and 420. List 431 is a second page of results (not fully shown) corresponding to domains 432 and 434.

Referring to FIG. 4A, the system identifies www.random.ca (420) as corresponding to a local domain for the Canadian user. The system identifies results corresponding to domains affiliated with www.random.ca (420) and demotes certain affiliated results. The system identifies www.random.co.uk (410) as an affiliated result corresponding to a domain registered in the United Kingdom. The system can demote www.random.co.uk by a predetermined number of positions or to a subsequent page of search results, e.g., by two positions or to the second page (list 431). Similarly, the system identifies www.random.de (416), registered in Germany, as being affiliated with www.random.ca (420), and demotes www.random.de (416) by two positions.

The system demotes some affiliated results and conserves the rank of others. For example, the system can identify www.random.au (408) as affiliated with www.random.ca (420), but can decide to conserve the rank of www.random.au (408) while demoting www.random.de (416). The system can make this decision according to, for example, a language-based presumption that Canadian users will be more interested in content presented in English (www.random.au indicating registration in Australia) than in German.

Referring to FIG. 4B, the system can swap the rank of www.random.ca (420) with the rank of an earlier-appearing affiliated result, in order to present the local results—which are assumed to be more interesting to the user—at a higher position within list 401. The system identifies www.random.co.uk (410) and www.random.org (414) as domains affiliated with local result www.random.ca (420). The system then elevates the rank of the local result by swapping either www.random.co.uk (410) or www.random.org (414) with www.random.ca (420) within the ordered list of results.

The system can swap results according to different presumptions. In FIG. 4B, the system identifies www.random.edu (418) and www.random.au (408) as being affiliated with www.random.ca (420) and as being non-local to the user's location (Canada). Because a Canadian user may find global content to be more interesting than content associated with Australia, the system can swap www.random.edu (418) with the earlier-appearing www.random.au (408). Alternatively, on the assumption that a Canadian user will prefer content associated with the United Kingdom over content associated with Australia, the system can swap www.random.co.uk (418) with www.random.au (408).

It should be noted that the ranks of results corresponding to unaffiliated domains are not affected by this process. In FIGS. 4A and 4B, www.not random.com (406), www.random.be (412), and www.not random.co.uk (432) are not affiliated with www.random.ca (420), and therefore are not affected. Further, the system can prevent the ranks of results corresponding to affiliated global domains from being affected. For example, in FIGS. 4A and 4B, the system conserves the rank of global affiliate www.random-affiliateprogram.corn (404).

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer program products, i.e., one or more modules of computer program instructions encoded on a computer-readable medium for execution by, or to control the operation of, data processing apparatus. The instructions can be organized into modules in different numbers and combinations from the exemplary modules described. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machinegenerated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method comprising:
receiving initial search results from a user search query including an ordered list of results, each result corresponding to a web domain;
determining a particular location for a user;
identifying a plurality of local domains, each local domain being a web domain that corresponds to the particular location of the user;

identifying a first result within the list of results corresponding to a first web domain, the first web domain being a local domain;

identifying a second result within the list of results corresponding to a second web domain designated as affiliated with the first domain, where the first domain has a same second level domain as the second domain, where the second domain is affiliated if it is linked to the first domain, and where the second domain is linked to the first domain if one of the first or the second domains includes resources containing one or more hyperlinks to resources of the other domain;

modifying the ordered list of results by altering one or more positions of the results, including altering a position of the second result, that correspond to a domain affiliated with one of the local domains within the list of results using one or more processors; and presenting the list of results to the user.

2. The method of claim 1, where altering the position of the second result includes demoting the second result within the list of results.

3. The method of claim 1, where altering the position of the second result includes promoting the second result within the list of results.

4. The method of claim 1, where altering the position of the second result includes clustering the second result with the first result within the list of results.

5. The method of claim 1, where the second domain is affiliated if it is directly linked to the first domain.

6. The method of claim 1, where the second domain is affiliated if it is linked to the first domain within a specified number of steps.

7. The method of claim 1, where the second domain is affiliated only if it has the same second-level domain name as the first domain.

8. The method of claim 1, where demoting the second result includes swapping a rank of the second result with a rank of the first result within the list of results.

9. The method of claim 8, where swapping a rank of a first affiliated result and a rank of a second affiliated result is performed according to presumption heuristics.

10. The method of claim 1, where demoting the second result within the list of results includes demoting the second result by a predetermined number of places within the ordered list of results.

11. A non-transitory computer readable medium encoded with a computer program, the program comprising instructions that when executed by one or more computers cause the one or more computers to perform operations comprising:

receiving initial search results from a user search query including an ordered list of results, each result corresponding to a web domain;

determining a particular location for a user;

identifying a plurality of local domains, each local domain being a web domain that corresponds to the particular location of the user;

identifying a first result within the list of results corresponding to a first web domain, the first web domain being a local domain;

identifying a second result within the list of results corresponding to a second web domain designated as affiliated with the first domain, where the first domain has a same second level domain as the second domain, where the second domain is affiliated if it is linked to the first domain, and where the second domain is linked to the first domain if one of the first or the second domains includes resources containing one or more hyperlinks to resources of the other domain, modifying the ordered list of results by altering one or more positions of the results, including altering a position of the second result, that correspond to a domain affiliated with the one of the local domains within the list of results; and presenting the list of results to the user.

12. The computer readable medium of claim 11, where altering the position of the second result includes demoting the second result within the list of results.

13. The computer readable medium of claim 11, where altering the position of the second result includes promoting the second result within the list of results.

14. The computer readable medium of claim 11, where altering the position of the second result includes clustering the second result with the first result within the list of results.

15. The computer readable medium of claim 11, where the second domain is affiliated if it is directly linked to the first domain.

16. The computer readable medium of claim 11, where the second domain is affiliated if it is linked to the first domain within a specified number of steps.

17. The computer readable medium of claim 11, where the second domain is affiliated only if it has the same second-level domain name as the first domain.

18. The computer readable medium of claim 11, where demoting the second result includes swapping a rank of the second result with a rank of the first result within the list of results.

19. The computer readable medium of claim 18, where swapping a rank of a first affiliated result and a rank of a second affiliated result is performed according to presumption heuristics.

20. The computer readable medium of claim 11, where demoting the second result within the list of results includes demoting the second result by a predetermined number of places within the ordered list of results.

21. A system, comprising:

one or more computers; and one or more storage devices storing instructions that when executed by the one or more computers, cause the one or more computers to perform operations comprising:

receiving initial search results from a user search query including an ordered list of results, each result corresponding to a web domain;

determining a particular location for a user;

identifying a plurality of local domains, each local domain being a web domain that corresponds to the particular location of the user;

identifying a first result within the list of results corresponding to a first web domain, the first web domain being a local domain;

identifying a second result within the list of results corresponding to a second web domain designated as affiliated with the first domain, where the first domain has a same second level domain as the second domain, where the second domain is affiliated if it is linked to the first domain, and where the second domain is linked to the first domain if one of the first or the second domains includes resources containing one or more hyperlinks to resources of the other domain, modifying the ordered list of results by altering one or more positions of the results, including altering a position of the second result, that correspond to a domain affiliated with one or more local domains within the list of results; and presenting the list of results to the user.

22. The system of claim 21, where the altering the position of the second result includes demoting the second result within the list of results.

23. The system of claim 21, where the altering the position of the second result includes promoting the second result within the list of results.

24. The system of claim 21, where altering the position of the second result includes clustering the second result with the first result within the list of results.

25. The system of claim 21, where the second domain is affiliated if it is directly linked to the first domain.

26. The system of claim 21, where the second domain is affiliated if it is linked to the first domain within a specified number of steps.

27. The system of claim 21, where the second domain is affiliated only if it has the same second-level domain name as the first domain.

28. The system of claim 21, where demoting the second result includes swapping a rank of the second result with a rank of the first result within the list of results.

29. The system of claim 28, where swapping a rank of a first affiliated result and a rank of a second affiliated result is performed according to presumption heuristics.

30. The system of claim 21, where demoting the second result within the list of results includes demoting the second result by a predetermined number of places within the ordered list of results.

* * * * *